US008693779B1

(12) United States Patent
Jain et al.

(10) Patent No.: US 8,693,779 B1
(45) Date of Patent: Apr. 8, 2014

(54) SEGMENTING PRINTED MEDIA PAGES INTO ARTICLES

(75) Inventors: Ankur Jain, Haryana (IN); Vivek Sahasranaman, Bangalore (IN); Shobhit Saxena, New Delhi (IN); Krishnendu Chaudhury, Bangalore (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/612,072

(22) Filed: Sep. 12, 2012

Related U.S. Application Data

(63) Continuation of application No. 12/191,120, filed on Aug. 13, 2008, now Pat. No. 8,290,268.

(51) Int. Cl.
G06K 9/34 (2006.01)
G06K 9/46 (2006.01)
G06K 9/66 (2006.01)

(52) U.S. Cl.
USPC ............ 382/175; 382/176; 382/195; 382/229

(58) Field of Classification Search
None
See application file for complete search history.

(56) References Cited

U.S. PATENT DOCUMENTS

| | | | | |
|---|---|---|---|---|
| 5,689,342 A | * | 11/1997 | Nakatsuka | 358/296 |
| 2007/0003166 A1 | * | 1/2007 | Berkner | 382/298 |
| 2008/0107338 A1 | * | 5/2008 | Furmaniak et al. | 382/176 |

* cited by examiner

*Primary Examiner* — Amir Alavi
*Assistant Examiner* — Kenny Cese
(74) *Attorney, Agent, or Firm* — Sterne, Kessler, Goldstein & Fox P.L.L.C.

(57) ABSTRACT

Methods and systems for segmenting printed media pages into individual articles quickly and efficiently. A printed media based image that may include a variety of columns, headlines, images, and text is input into the system which comprises a block segmenter and an article segmenter system. The block segmenter identifies and produces blocks of textual content from a printed media image while the article segmenter system determines which blocks of textual content belong to one or more articles in the printed media image based on a classifier algorithm. A method for segmenting printed media pages into individual articles is also presented.

20 Claims, 8 Drawing Sheets

SEGMENTING PRINTED MEDIA PAGES INTO ARTICLES

CROSS-REFERENCE TO RELATED APPLICATIONS

This application is a continuation of U.S. patent application Ser. No. 12/191,120, filed Aug. 13, 2008, which is incorporated herein by reference in its entirety.

BACKGROUND

1. Field of the Invention

The present invention relates to computer-aided analysis of printed media material.

2. Related Art

Computers are increasingly being used to perform or aid in the analysis of documents and printed material. Such analysis includes the identification of the location and relative arrangement of text and images within a document. Such document layout analysis can be important in many document imaging applications. For example, document layout analysis can be used as part of layout-based document retrieval, text extraction using optical character recognition, and other methods of electronic document image conversion. However, such analysis and conversion generally works best on a simple document, such as a business letter or single column report, and can be difficult or unworkable when a layout becomes complex or variable.

Complex printed media material, such as a newspaper, often involve columns of body text, headlines, graphic images, multiple font sizes, comprising multiple articles and logical elements in close proximity to each other, on a single page. Attempts to utilize optical character recognition in such situations are typically inadequate resulting in a wide range of multiple errors, including, for example, the inability to properly associate text from multiple columns as being from the same article, mis-associating text areas without an associated headline or those articles which cross page boundaries, and classifying large headline fonts as a graphic image.

What are needed, therefore, are systems and/or methods to alleviate the aforementioned deficiencies. Particularly, what is needed is an effective and efficient approach to recognize and analyze printed media material which is presented in a complex columnar format in order to segment the printed media material into articles.

BRIEF SUMMARY

Consistent with the principles of the present invention as embodied and broadly described herein, embodiments of the present invention include a printed media article segmenting system comprising a block segmenter and an article segmenter. The block segmenter is configured to accept a printed media image in which the foreground is analyzed resulting in the detection and identification of lines and gutters within the image. Furthermore, the block segmenter will perform an optical character recognition analysis as well as a block type identifier which produces headline blocks and body-text blocks.

The article segmenter is configured to accept the headline and body-text blocks in order to determine if a given pair of blocks belong to the same or different article. Blocks that are determined to belong to the same article are then assembled into a single electronic based article and merged with a corresponding headline, if one exists.

In another embodiment, the article segmenter classifies blocks using a classification and regression trees (CART) classifier machine learning algorithm.

In another embodiment, the article segmenter classifies blocks using a rule based classifier algorithm.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION

The present invention relates to the segmenting of printed media images. In embodiments of this invention, a printed media article segmenting system comprises a block segmenter and an article segmenter wherein the block segmenter is configured to accept a printed media image and generate block pairs of headline and body-text. The article segmenter is configured to accept the block pairs and generate articles comprising related blocks.

While specific configurations, arrangements, and steps are discussed, it should be understood that this is done for illustrative purposes only. A person skilled in the pertinent art(s) will recognize that other configurations, arrangements, and steps may be used without departing from the spirit and scope of the present invention. It will be apparent to a person skilled in the pertinent art(s) that this invention may also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
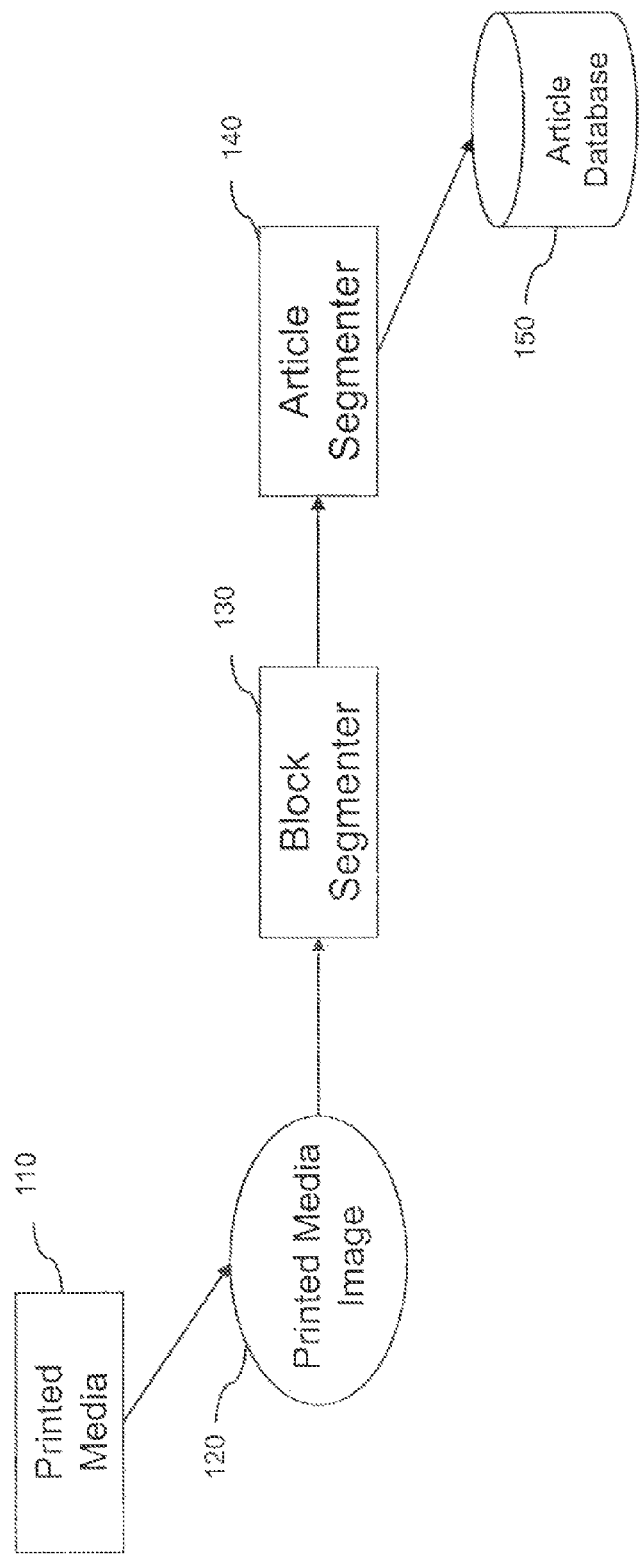
FIG. 1 is a system diagram depicting an implementation of a system for segmenting printed media pages into articles according to an embodiment of the present invention.

FIG. 1 is an illustration of a printed media article segmenting system 100 according to an embodiment of the present invention. System 100 comprises an inputted piece of printed media 110, from which a printed media image 120 is obtained. Printed media image 120 is processed by block segmenter 130 and article segmenter 140, thereby producing articles which are stored in articles database 150.

Block segmenter 130 starts by detecting structuring elements on printed media image 120 primarily consisting of gutters and lines. Gutters and lines maybe identified on printed media image 120 using a series of filtering and image morphological operations. Once block segmenter 130 detects the gutters and lines, printed media image 120 is processed through an optical character recognition method and chopped by the previously detected gutters and lines resulting in a new set of paragraphs which are identified as headline or body-text blocks.

Article segmenter 140 utilizes a rule-based system in order to group the headline and body-text blocks into articles. However, in another embodiment, a classification and regression tree machine learning algorithm is used to group the headline and body-text blocks into articles. Both classification embodiments may generate an adjacency matrix, A, where A(i,j)=1 implies blocks i and j belong to the same article, the entire article being the transitive closure of blocks.

System 100 (including its component modules) can be implemented in software, firmware, hardware, or any combination thereof. System 100 can be implemented to run on any type of processing device (or multiple devices) including, but not limited to, a computer, workstation, distributed computing system, embedded system, stand-alone electronic device, networked device, mobile device, set-top box, television, or other type of processor or computer system.

In one embodiment, system 100 may operate to generate articles, or identify articles, for storage in article database 150. In another embodiment, information in article database 150 may be further accessed to fulfill search queries. For example, a remote user may enter a search query over the world wide web. The search engine (not shown) may them fulfill the search query with information in article database 150. This information may also have been previously indexed by a search engine to facilitate searches as is known in the art.

Foreground Detection

Figure 2:
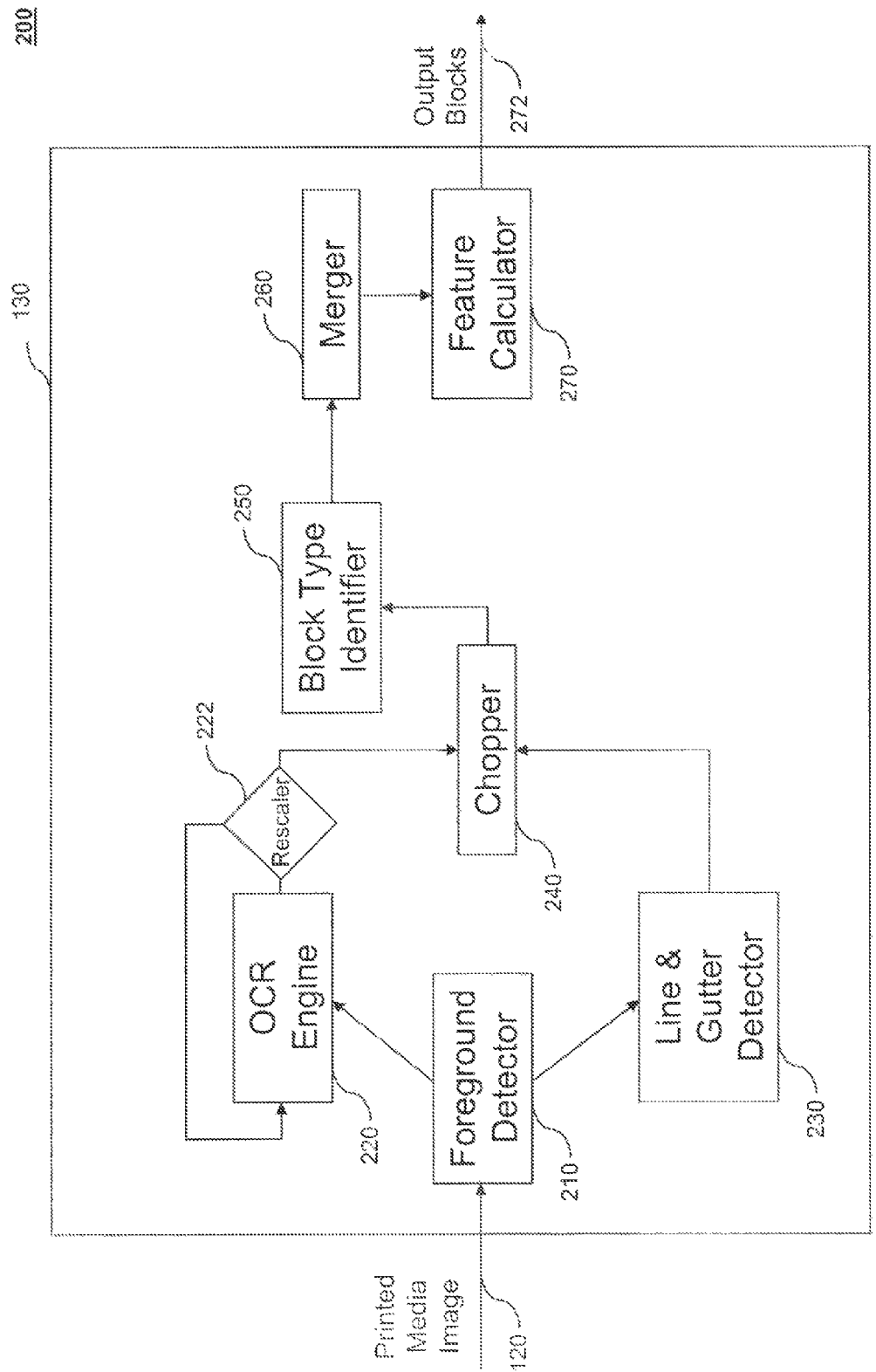
FIG. 2 is a system diagram of the block segmenter depicting an implementation of a system for segmenting printed media pages into articles according to an embodiment of the present invention.

FIG. 2 illustrates a more detailed view of block segmenter 130 according to an embodiment of the present invention. Block segmenter 130 is configured to receive a printed media image 120. Printed media image 120 is first analyzed by foreground detector 210. As printed media images are sometimes retrieved from sources such as microfilm, the background of the image may be extremely noisy. In addition, background and foreground gray levels may vary significantly, by page, within a page, and between multiple rolls of microfilm. Because of such variations, a global thresholding based binarization is not suitable. Therefore, foreground detector 210 utilizes an analysis based on image morphological grayscale reconstruction.

Figure 3:
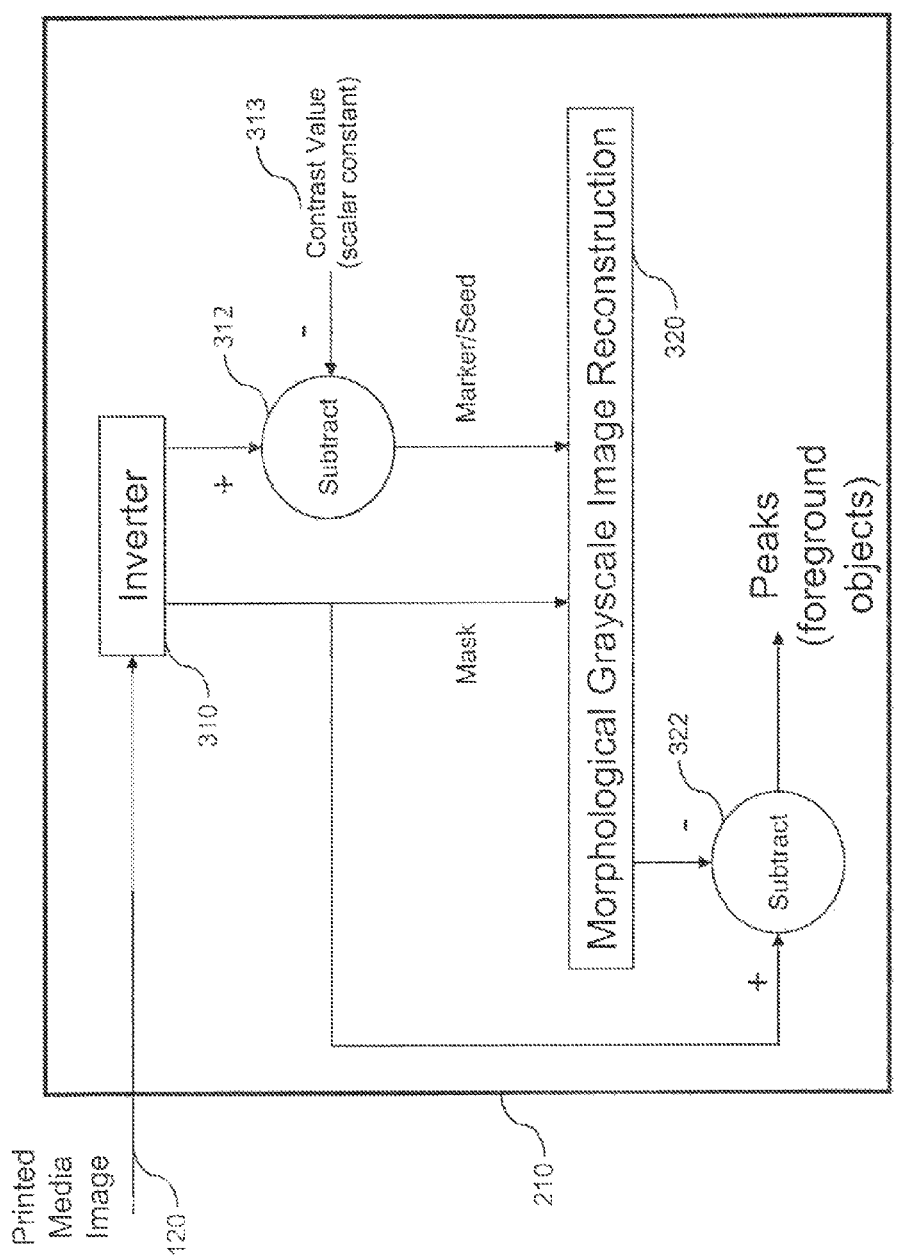
FIG. 3 is a system diagram of the foreground detector depicting an implementation of a system for segmenting printed media pages into articles according to an embodiment of the present invention.

FIG. 3 illustrates a more detailed view of the foreground detector 210 according to an embodiment of the present invention. In this embodiment, it is assumed that printer media image 120 is such that the foreground is whiter than background. In another embodiment, if necessary, the original image may be inverted by inverter 310 to achieve a foreground that is whiter than the background. While the background or foreground will not occur at constant gray levels, it is taken that there will be a minimum contrast level 313 between the foreground and background. The minimum contrast level 313 is subtracted from printed media image, or the inverted printed media image 120 if the foreground was no whiter than the background, and resulting in a marker/seed image which is then directed to morphological grayscale image reconstructor 320. The marker/seed image along and the printed media image 120, as a mask, are input to morphological grayscale image reconstructor 320. The output of morphological grayscale image reconstructor 320 is then subtracted from the mask image where the remaining images appear as a peak or dome above the background. In this manner, foreground detector 210 acts as a peak detector. The result of foreground detector 210 is a binarized image of printed media image 120.

Optical Character Recognition (OCR)

In FIG. 2, once printed media image 120 is processed by foreground detector 210, the resultant image is analyzed by optical character recognition (OCR) engine 220 and line and gutter detector 230. OCR engine 220 performs a first pass to recognize characters within printed media image 120 that has been processed by foreground detector 210. OCR engine 220 processes all blocks that are recognized as text from the image. In order to attempt to recognize characters that may have been mistaken as not being text because of size, for example a very large headline font, the resulting image is scaled down by rescaler 222 and made smaller by a factor of two at which point OCR engine 220 again attempts to recognize additional text. This process is repeated, in this embodiment, a total of three iterations in the attempt to recognize all large text not initially recognized by OCR engine 220.

In another embodiment, the imaged is scaled up by rescaler 222 and made larger by a factor of two in an order for OCR engine 220 to recognize small text that may not otherwise be recognized. In this embodiment, the process is repeated for a total of three iterations in the attempt to recognize all small text not initially recognized by OCR engine 220.

Gutter Detection

A gutter within a printed media image is classified as either a vertical gutter or a horizontal gutter. A vertical gutter is a tall, narrow white region typically separating blocks of text, headline, or images within printed media image 120. A horizontal gutter is a short, wide white region typically separating blocks of text, headline, or images within printed media image 120. In other words, blocks in printed media image 120 may be defined and bounded by gutters and/or lines.

Figure 4:
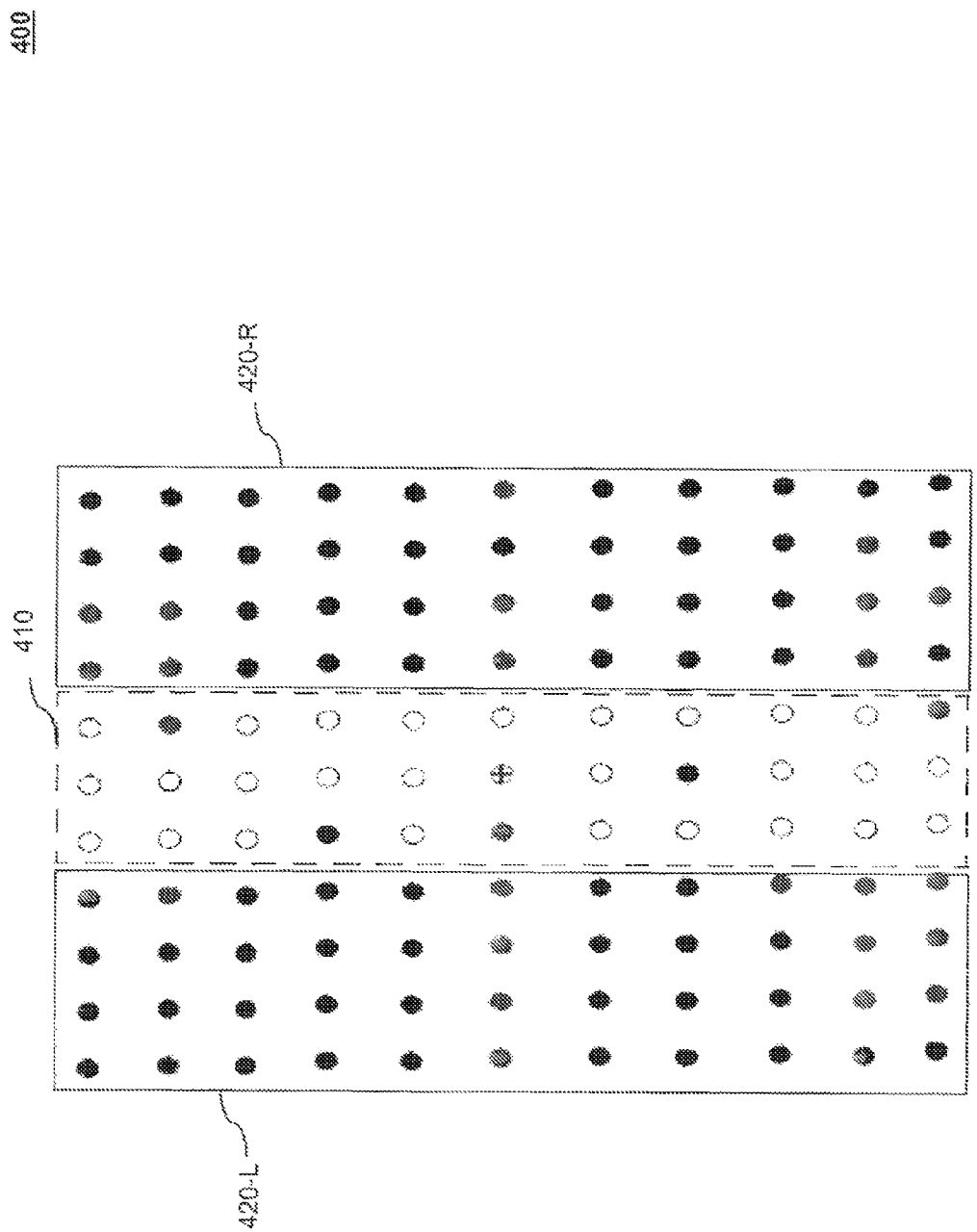
FIG. 4 is a diagram illustrating an example of a process for gutter and line detection according to an embodiment of the present invention.

In an embodiment, vertical gutters are detected utilizing a tall narrow filter which responds to pixels lying within a region that is tall, narrow and mostly white. In order to minimize the impact or skew and noise in printed media image 120, a particular pixel within printed media image 120 is analyzed by placing a tall, narrow rectangular window centered around the pixel being analyzed. This skew process is illustrated in FIG. 4 as skew robust gutter and line detection system 400 according to an embodiment of the present invention. The pixel being examined is shown in FIG. 4 at the center of the tall narrow rectangular window 410 marked by a "+" sign. The tall narrow rectangular window 410 corresponds to vertical gutter detection and is shown with a dashed outline which encloses the primarily white space surrounded by dark areas 420-L and 420-R.

In order to determine if the particular pixel being examined corresponds to a gutter, in this example a vertical gutter, after rectangular window 410 is applied the number of white pixels on each row, within the rectangular window 410, are counted. If the ratio of white to black pixels exceeds a minimum percentage threshold, the row is considered "white." The process is repeated for each row. If the total percentage of white-rows within rectangular window 410, exceeds a second threshold percent, for example, 99%, then the center pixel being analyzed is marked as a vertical gutter pixel.

As seen in FIG. 4, the analyzed pixel, as indicated by a "+" sign, is at the center of rectangular window 410. As an example, if the minimum percentage threshold for each row is 66%, then in FIG. 4 as there are three pixels per row, the row will be considered "white" if two or three of the pixels within each row are white. Therefore, in the example of FIG. 4, all the rows within rectangular window 410 would be "considered" white. The next step in this analysis example would be to determine if the total percentage of white-rows exceeds a second threshold percentage, as an example 99%, to determine that the center pixel being analyzed is to be marked as a vertical gutter pixel. In this example, as the total percentage of "considered" white-rows is 100%, this exceeds the threshold example percentage of 99% and therefore the center pixel marked with the "+" sign would be marked as a vertical gutter pixel.

The approach demonstrated in FIG. 4 does not require every pixel within rectangular window 410 to be white in order to determine that the pixel being analyzed is to marked as a gutter pixel, thus increasing noise tolerance. In addition, this approach does not require the white pixel to have exact vertical alignment as small placement variations can be tolerated as illustrated within rectangular window 410 of FIG. 4. The width and height of rectangular window 410 is chosen dynamically as constant multiples of the mode height of connected components on a printed media image page 120. As an example, if the printed media image 120 was that of a newspaper, the mode height of connected components would typically correspond to the height of a body text line.

In a similar manner, pixels can be analyzed to be marked as a horizontal gutter pixel by the use of a short, wide rectangular window in place of the tall, narrow rectangular window as illustrated in FIG. 4. Once all applicable pixels have been analyzed, the union of the vertical and horizontal gutter pixels is made to obtain a gutter image.

Line Detection

Line and gutter detector 230 also performs line detection in an analogous manner to that of gutter detection. However, as lines are often made up of short narrow pieces of foreground object, the filter based approach described above for detecting gutters does not necessarily detect such a line. Therefore, in this embodiment, the following nine step approach is utilized in the operation of line and gutter detector 230:

L1. Perform a filter-based line detection in order to detect both vertical and horizontal lines. The resulting lines are called strict lines.

L2. Delete all strict horizontal lines (detected in step 1) from the input image.

L3. Perform morphological open on the resulting image with a rectangular structuring element. The width of the rectangle corresponds to the maximum expected line width. This eliminates all portions of the image narrower than the width of the structural element.

L4. Subtract above image from the image obtained in step 2. This image has only narrow portions.

L5. Perform morphological close on the image in step 4. This will fill the gaps between small narrow pieces.

L6. Perform a connected component analysis on the closed image. Delete components shorter than a predetermined threshold. Results are narrow objects whose height (after closing) is greater than the threshold.

L7. Perform morphological binary reconstruction with the binary image as mask and the image from step 6 as marker. This yields all connected components in the input image which has at least one narrow portion that is reasonably tall (after closing).

L8. Perform connected component analysis on the image. Retain components whose height exceeds a second threshold which is higher than the threshold in step 6, or which have a substantial intersection with strict vertical lines. Therefore, components are retained that are either substantially tall themselves or extend strict lines.

L9. Eliminate portions of lines where which intersect detected OCR words. This removes spurious lines (caused by scratches etc) which run through text.

This example of rules L1-L9 is illustrative and not intended to limit the invention. Other rules may be used to detect line and gutters as would be apparent to a person skilled in the art given this description.

Sub-Dividing OCR Generated Paragraphs

When gutters and lines have been identified by line and gutter detector 230, the results are overlaid upon the paragraphs returned by OCR engine 220. Chopper 240 generates a set of smaller, sub-images, that correspond to a rectangular bounding box of an OCR block from printed media image 120. In each sub-image all the pixels that correspond to gutters or lines are set to "white" wherein a connected component analysis is performed on the resulting image. Chopper 240 segments the OCR identified paragraphs whenever gutters and lines surround a block of text. In this manner a new set of paragraphs are generated by chopper 240 where none of the text straddles a line or gutter.

Identifying Headline and Body-Text Paragraphs

The purpose of block type identifier 250 is to distinguish between text that is considered to be a headline and that text that is part of the body of an article. OCR engine 220 attempts to recognize all text characters. If OCR engine 220 cannot identify a block as comprising characters, OCR engine 220 tags the block as an image. However, due to large variations of font sizes found in printed media image 120, OCR engine 220 may mistake paragraphs and blocks that contain large fonts as an image. Furthermore, block type identifier 250 marks a block labeled as text by OCR engine 220 as a headline if the text is comprised of relatively large fonts and/or mostly upper-case letters. The cutoff font size is determined by block type identifier 250 generating a histogram of font-size over an entire page of printed media image 120.

In order to verify that the font size of the text reported by OCR engine 220 is correct, block type identifier 250 corroborates the size of the symbol bounding box with the OCR engine 220 reported font size. If the two font sizes are not essentially equivalent, then the concerned block is not marked as a headline.

Creating Blocks Via Merging

The output of block type identifier 250 consists of a set of paragraphs that are tagged as headlines or body-text. From this set of paragraphs, merger 260 combines paragraphs into a set of blocks, each consisting of a collection of paragraphs. In an example, merger 260 accomplishes this task using the following rules:

M1. Headline paragraphs can only be merged with other headline paragraphs. Body-text paragraphs can only be merged with other body-text paragraphs.

M2. Headline paragraphs are not merged if the text within the paragraphs is not aligned. Alignment is determined by fitting a least squares line through the baseline points of individual symbols and measuring the fitting error.

M3. Body text paragraphs that are vertical neighbors (i.e., one is above the other with no other block intervening) are merged if both left and right margins are essentially aligned.

M4. Horizontally neighboring paragraphs are merged if the top and bottom margins are essentially aligned.

M5. Body-text paragraphs are not merged if they are separated by a line or gutter. Headline paragraphs are not merged if they are separated by vertical lines. However, headline paragraphs can be merged across gutters or horizontal lines.

This example of rules M1-M5 is illustrative and not intended to limit the invention. Other rules may be used to identify blocks for merger as would be apparent to a person skilled in the art given this description.

Assigning Headline to Body-Text Blocks

Implementation of the above rules by merger 260 results in the generation of a set of headline blocks and a set of body-text blocks. However, typically a body-text block is associated with a headline block. Therefore, merger 260 analyzes body-text blocks for the existence of an associated headline block. Merger 260 accomplishes the associating of a headline block to one or more body-text blocks by identifying a body-text block as a candidate for a specific headline block where the midpoints of a headline block lie above the midpoint of a body-text block and the headline block horizontally overlaps with the body-text block.

The lowest candidate headline block is taken to be the headline of the body-text block in question, unless there is a horizontal line, not immediately below the headline that separates the headline block from the body-text block as many printed media publishers will place a line immediately below many headlines. However, other intervening lines will delink a block and a headline, at which point the body-text block is considered an orphan with no associated headline block.

Feature Computation

Feature calculator 270 computes a plurality of features associated with each identified block. Feature calculator 270 computes the block geometry associated with each block which consists of the top-left corner coordinates, and the width and height of the block bounding box. In addition, feature calculator 270 identifies the lowest headline above the block, if present, and whether there is a line between the block and the associated headline. For all neighboring blocks, feature calculator 270 computes whether there is a line separating the two blocks, which is necessary for article segmenter 140 in determining if the neighboring blocks belong to the same article. Block segmenter 130 then produces output blocks 272 with associated geometry.

Block segmenter 130 as shown in FIG. 2 is illustrative and is not intended to limit the present invention. For instance, block segmenter 130 is not limited to each of the components 210-270. For example, OCR engine 220 may be separated from block segmenter 130 and instead merely communicates with foreground detector 210 and chopper 240 as described herein.

CART Classifier

Figure 5:
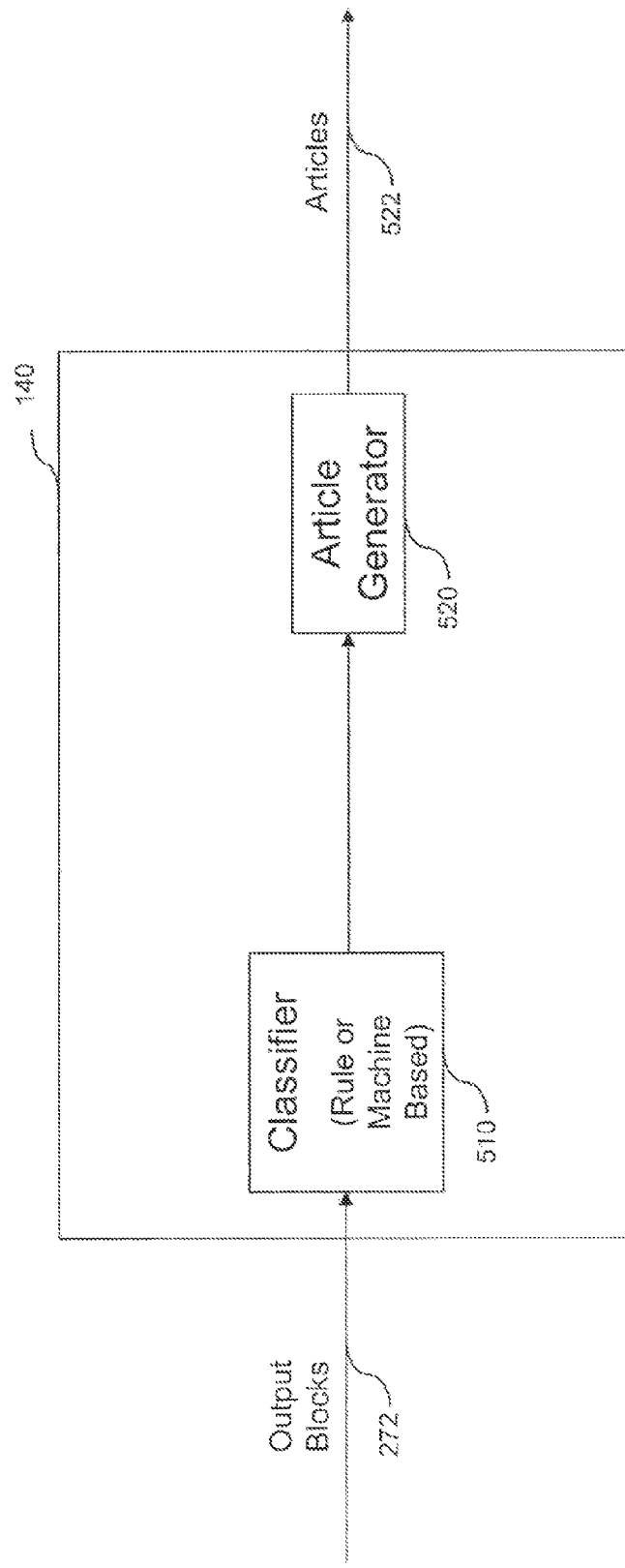
FIG. 5 is a system diagram of the article segmenter system depicting an implementation of a system for segmenting printed media pages into articles according to an embodiment of the present invention.

FIG. 5 illustrates a more detailed view of article segmenter 140 according to an embodiment of the present invention. Article segmenter 140 is configured to receive output blocks 272 from block segmenter 130. Article segmenter comprises classifier 510 and article generator 520.

In one embodiment, classifier 510 utilizes a classification and regression tress classifier machine learning algorithm (CART) to determine if a given pair of blocks belong to the same article. In another embodiment, classifier 510 utilizes a rules based classified algorithm to determine if a given pair of blocks belong to the same article.

In one embodiment where classifier 510 uses a CART classifier, classifier 510 utilizes and compares the following information to determine if neighboring block pairs belong to the same or different same article:

For vertical neighbors

V1. Average width of boxes.

V2. Distance between boxes

V3. Relative width difference between boxes.

V4. Left alignment between boxes.

V5. Right alignment between boxes.

In addition to V1-V5, where the vertical neighbors are separated by a headline:

V6. Alignment of the headline's left margin with the mean left margin of the two boxes.

V7. Alignment of the headline's right margin with the mean right margin of the two boxes.

V8. Headline width.

V9. Distance between headline and top box.

V10. Distance between headline and bottom block

V11. Headline height.

V12. Headline word count.

V13. Headline average font size.

V14. Headline maximum font size.

For horizontal neighbors

H1. Average width of boxes.

H2. Distance between boxes.

H3. Relative width difference between boxes.

H4. Top alignment between boxes.

H5. Intervening line strength.

In addition to H1-H5, where the horizontal neighbors have a shared headline:

H6. Alignment of the headline's left margin with the left margin of the left box.

H7. Alignment of the headline's right margin with the right margin of the right box.

H8. Headline width.

H9. Distance between headline and boxes

H10. Headline height.

H11. Headline word count.

H12. Headline average font size.

H13. Headline maximum font size.

This example of rules V1-V14 and H1-H13 are illustrative and not intended to limit the invention. Other rules may be used to determine if a given pair of blocks belong to the same article as would be apparent to a person skilled in the art given this description.

Classifier 510, utilizing a CART classifier, is trained separately for each printed media image 120 title where the training data is generated where, by the use of a term frequency-inverse document frequency (TF-IDF) language, a similarity measure is computed between all pairs of neighboring blocks. Where the similarity is very high, that block pair is used as a positive example, where the similarity is very low, that block is used as a negative example.

Rule-Based Classifier

Figure 6:
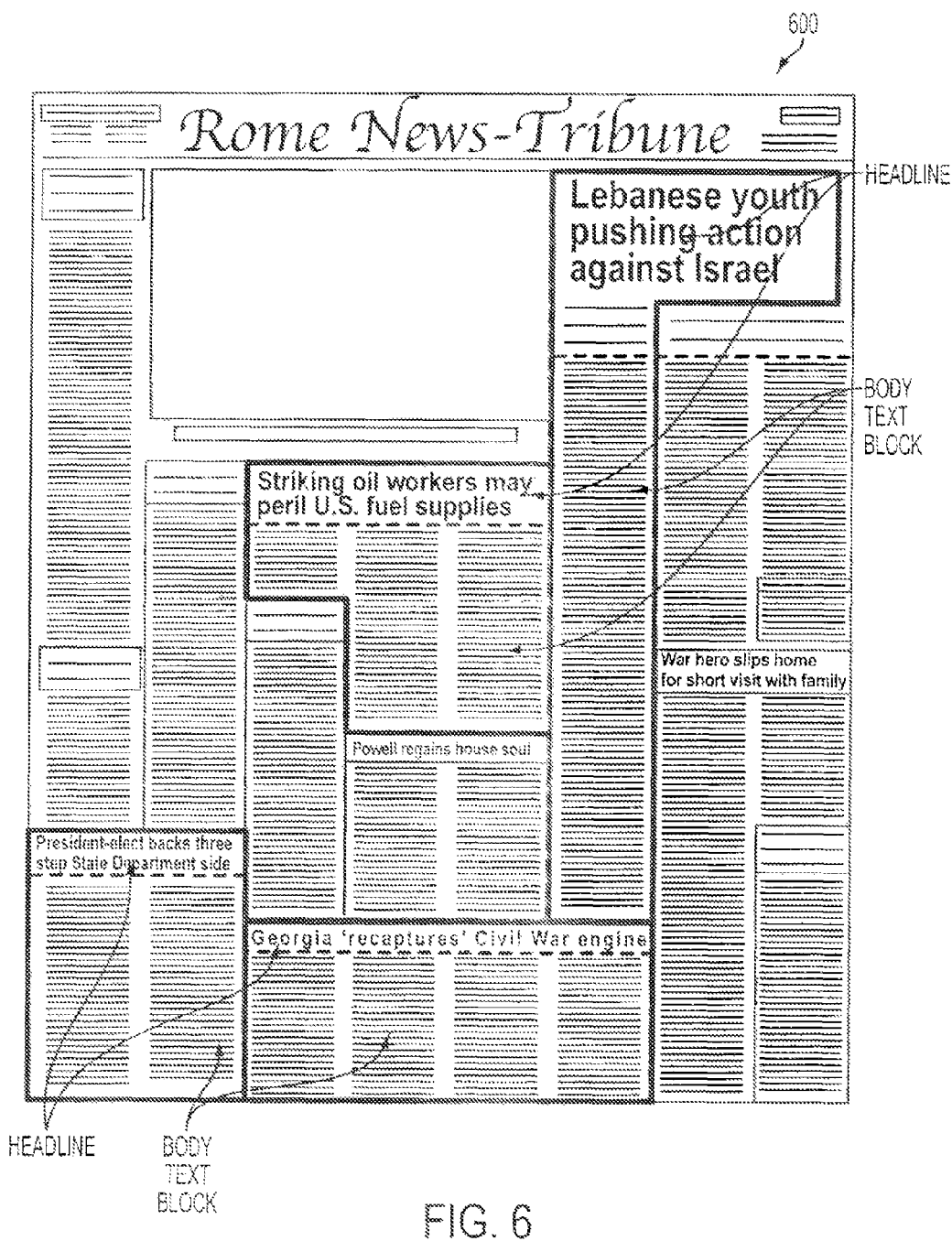
FIG. 6 is a copy of a printed media image showing headline and body text blocks according to an embodiment of the present invention.

In one embodiment where classifier 510 uses a rule-based classifier, classifier 510 may use the following rules to determine if neighboring block pairs belong to the same or different same article:

Common Headline Rule:

Using a rule-based classifier algorithm, classifier 510 determines that blocks with a common assigned headline belong to the same article. Examples of a common assigned headline are illustrated in FIG. 6.

Figure 7:
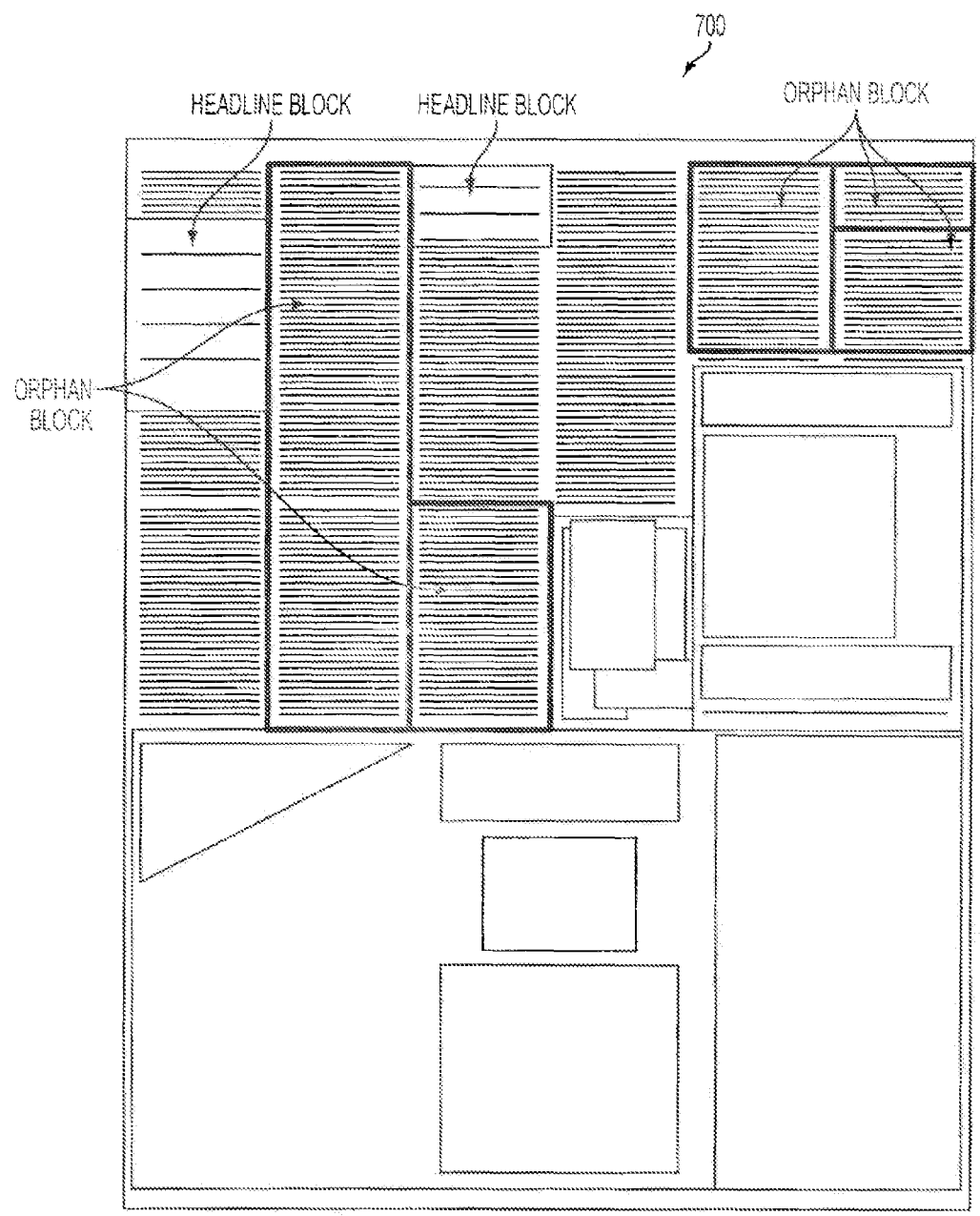
FIG. 7 is a copy of a printed media image showing orphan blocks according to an embodiment of the present invention.

Orphan Block Rule:

Using a rule-based classifier algorithm, classifier 510 determines that blocks without an assigned headline are considered orphan blocks. Examples of orphan blocks are illustrated in FIG. 7.

Only orphan blocks that are section-starters may be linked to another block where a section-starter orphan block is defined to be an orphan block immediately below a section-separator or at the top of a page. A section-separator is defined as a line which spans multiple body-text blocks, headline, and/or picture.

When an orphan block is identified, classifier 510 determines if there are any candidate blocks that may be linked to the orphan block. A block is a candidate block only if there is no other block between its right margin and the section-starter orphan block's left margin. In addition, the bottom of the candidate block must be below the top margin of the section-starter orphan block. In this embodiment, a block is not considered to be a candidate block if it is located completely above the section-starter orphan block but the candidate block is a candidate if it is located completely below the section-starter orphan block. The section-starter orphan block is linked to the topmost candidate block that is immediately above a section-separator.

Generating Articles

Article generator 520 uses the results of classifier 510 to construct an article comprising a headline block and body-text blocks. Classifier 510 effectively generates an adjacency matrix, A where:

$$A(i, j) = \begin{cases} 1 \\ 0 \end{cases}$$

depending on whether blocks i and j belong to the same article. Article generator 520 completes the generation of articles where the article is a transitive closure of blocks belongs to the same article using a graph connected component algorithm.

For example, if block "A" is a headline block, with block "B" being a text block located directly below block "A" with no horizontal lines in between blocks "A" and "B", then blocks "A" and "B" would be considered to be in the same article, beginning at block "A" and progressing to block "B". Furthermore, as an example, if there is a block "C" adjacent to block "B" with continuing text, then block "C" would also be considered part of the same article and continuing from block "B". The adjacency matrix, using a graph connected algorithm, representing the article "ABC" would therefore be represented as the following adjacency matrix consisting of the linked "AB" blocks and the linked "BC" blocks:

|   | A | B | C |    |
|---|---|---|---|----|
| A | 0 | 1 | 0 | AB |
| B | 0 | 0 | 1 | BC |
| C | 0 | 0 | 0 |    |

Figure 8:
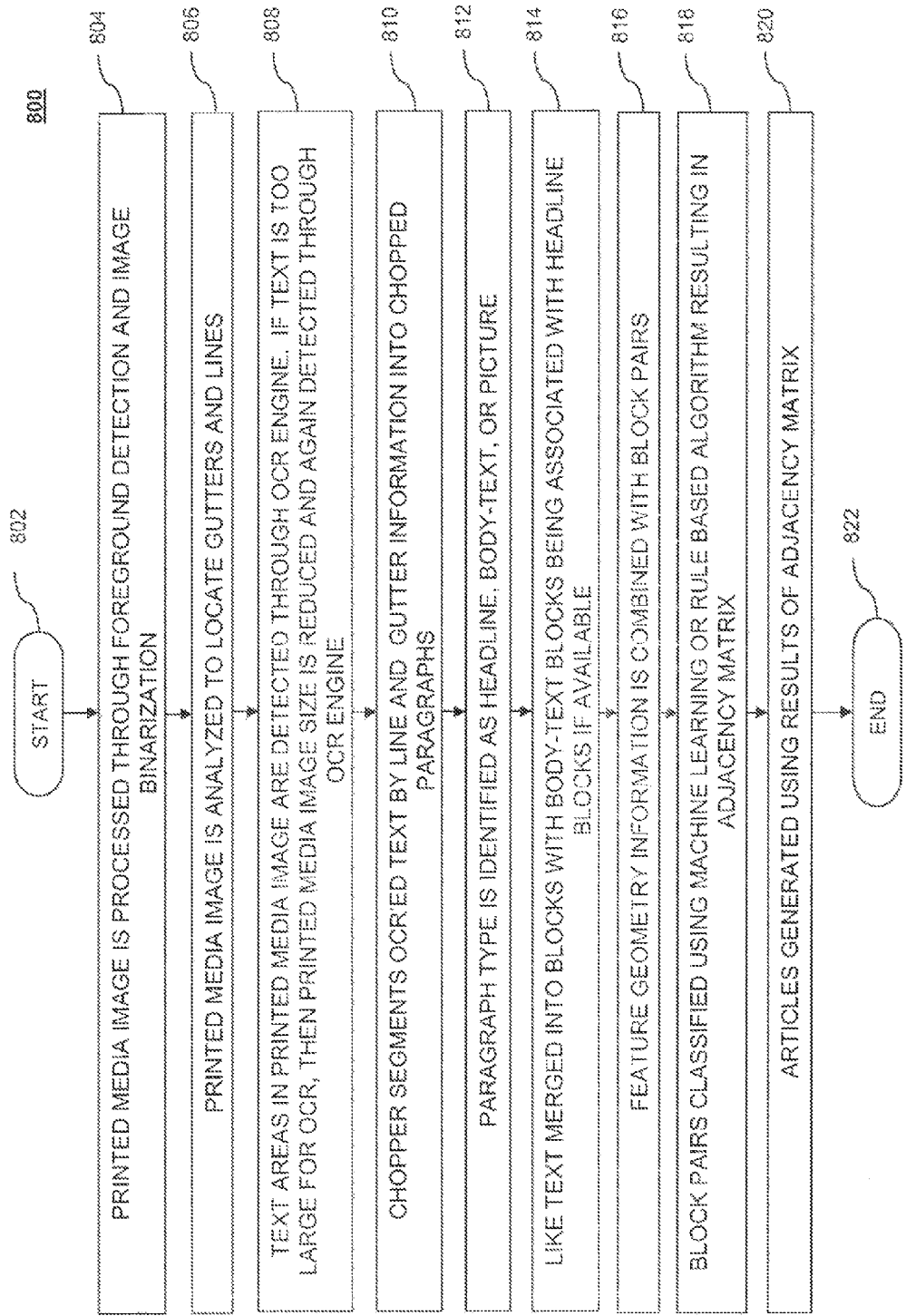
FIG. 8 is a flowchart depicting a method for segmenting printed media pages into articles according to an embodiment of the present invention.

FIG. 8 is a flowchart depicting a method 800 segmenting printed media page images into articles according to an embodiment of the present invention. Method 800 begins at step 802. In step 804, a printed media image is processed using foreground detection and image binarization in order to detect the foreground images. In step 806, the printed media image is analyzed to locate all horizontal and vertical gutters and lines. In step 808, the text areas of the printed media image are optically character recognized (OCR) wherein if text is too large to be recognized by OCR, the image size is reduced and again detected through OCR. In step 810, the identified gutters and lines are imposed on the optically recognized characters in order to generate chopped paragraphs where text does not straddle any gutter or line.

In step 812, the chopped paragraphs of step 810 are identified and tagged as being a headline, body-text, or image paragraph. In step 814, paragraphs of the same type are merged into blocks and body-text blocks are associated with headline blocks, if appropriate. In step 816, positional and size feature geometry is associated with each block. In step 818, blocks are classified using machine learning or rule based algorithms resulting in an adjacency matrix. In step 820, a determination of adjacency is made using the adjacency matrix of step 818 to combine blocks associated with each article to generate the finished article. For example, in one embodiment, an adjacency matrix may be used to combine blocks associated with the same article. Method 800 ends at step 822.

The processes and methods of FIGS. 1, 2, 3, 4, 5, 6, 7, and 8 can be implemented in software, firmware, or hardware, or using any combination thereof. If programmable logic is used, such logic can execute on a commercially available processing platform or a special purpose device. For instance, at least one processor and a memory can be used to implement the above processes.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A printed media article segmenting system, comprising:
a block segmenter configured to identify and produce blocks of content from a printed media image, the block segmenter comprising a block type identifier and a merger, the block type identifier being configured to output from the media image a set of paragraphs that are tagged as headlines or body-text and the merger being configured to combine the paragraphs into sets of blocks;
an article segmenter system configured to determine which blocks of content belong to one or more articles in the printed media image based on a classifier algorithm;
the article segmenter being configured to determine that blocks with a common assigned headline belong to the same article; and to determine, that blocks without an assigned headline are orphan blocks, and where an orphan block is identified, the article segmenter being further configured to determine whether there are any candidate blocks that may be linked to the orphan block; and
an article generator configured to use the results of the article segmenter to construct an article comprising a headline block and body text blocks,
wherein a block is a candidate block if the bottom of the candidate block is located below the top margin of a section-starter orphan block.

2. The printed media article segmenting system of claim 1, wherein said merger is further configured to:
merge a first headline paragraph with a second headline paragraph, wherein the first and second headline paragraphs are not merged if text within the first and second headline paragraphs are not aligned; and
merge a first body-text paragraph with a second body-text paragraph, wherein the first and second body text paragraphs are vertical neighbors and are merged only if a first and second margin of the first and second body-text paragraphs are essentially aligned.

3. The printed media article segmenting system of claim 1, wherein said block segmenter is further configured to associate a specific headline block to a body-text block, where a midpoint of the specific headline block lies above a midpoint of the body-text block and the specific headline block horizontally overlaps the body-text block.

4. The printed media article segmenting system of claim 1, wherein said block segmenter further comprises a feature calculator configured to:
compute a plurality of features associated with an identified block;
generate a block geometry based on an upper of a corner coordinate, a width, and a height, of a block bounding box;
identify a closest headline above the identified block, if present, and determine if a line exists between the identified block and the identified closest headline; and
compute, for all neighboring blocks, whether there is a line separating the two blocks.

5. The printed media article segmenting system of claim 1, wherein said block segmenter further comprises a chopper system configured to segment paragraphs of the printed media image in accordance with lines and gutters identified by a line and gutter system.

6. The printed media article segmenting system of claim 5, wherein the block type identifier is configured to classify the segmented paragraphs of the chopper system as at least one of body-text, image, and headline, wherein the segmented paragraphs of the same type are merged into blocks.

7. The printed media article segmenting system of claim 1, wherein if an orphan block is a section-starter orphan block then it may be linked to another identified block when the section-starter orphan block is an orphan block immediately below a section separator or at the top of a page; and
wherein an identified block is a candidate block only if there is no other block between a margin of the candidate block and a margin of the section-starter orphan block where the bottom of the candidate block is below the top margin of the section starter orphan block.

8. The printed media article segmenting system of claim 7, wherein said article segmenter system further comprises:
a classifier system configured to determine if a plurality of text blocks belong to the same article based on an adjacency matrix comprising the candidate block; and
wherein the article generator is configured to construct an article based on the adjacency matrix.

9. A method for segmenting printed media pages into articles, comprising:
outputting, using a block type identifier, from a media image a set of paragraphs that are tagged as headlines or body-text;
combining, using a merger, the paragraphs into set of blocks;
determining which blocks of content belong to one or more articles in the printed media image based on a classifier algorithm;
determining, using the classifier algorithm, that blocks with a common assigned headline belong to the same article, and to determine that blocks without an assigned headline are orphan blocks, and where an orphan block is identified, to determine whether there are any candidate blocks that may be linked to the orphan block; and
constructing, using the results of the classifier, an article that includes a headline block and a body-text block,
wherein a block is a candidate block if the bottom of the candidate block is located below the top margin of a section-starter orphan block.

10. The method of claim 9, further comprising:
merging a first headline paragraph with a second headline paragraph, wherein the first and second headline paragraphs are not merged if text within the first and second headline paragraphs are not aligned; and
merging a first body-text paragraph with a second body-text paragraph, wherein the first and second body text paragraphs are vertical neighbors and are merged only if a margin of the first and a margin of the second body-text paragraphs are essentially aligned.

11. The method of claim 9, further comprising:
associating a specific headline block to a body-text block where the midpoint of the specific headline block lies above the midpoint of the body-text block and the specific headline block horizontally overlaps the body-text block.

12. The method of claim 9, further comprising:
computing a plurality of features associated with an identified comprising:
generating a block geometry based on an upper corner coordinate, a width, and a height, of a block bounding box;
identifying a closest headline above the identified block, if present, and determine if a line exists between the identified block and the identified closest headline; and
computing, for all neighboring blocks, whether there is a line separating the two blocks.

13. The method of claim 9, further comprising:
identifying an orphan block,
wherein if the orphan block is a section-starter orphan block then it may be linked to another identified block when the section-starter orphan block is an orphan block immediately below a section-separator or at the top of a page, and
wherein an identified block is a candidate block only if there is no other block between a margin of the candidate block and a margin of the section-starter orphan block where the bottom of the candidate block is below the top margin of the section starter orphan block.

14. The method of claim 9, further comprising:
determining if a plurality of text blocks belong to the same article based on an adjacency matrix comprising the candidate block; and constructing an article based on the adjacency matrix.

15. A non-transitory computer readable storage medium having instructions stored thereon, when executed by a processor, cause the processor to perform operations including:
outputting, using a block type identifier, from a media image a set of paragraphs that are tagged as headlines or body-text;
combining, using a merger, the paragraphs into set of blocks;
determining which blocks of content belong to one or more articles in the printed media image based on a classifier algorithm;
determining, using the classifier algorithm, that blocks with a common assigned headline belong to the same article and to determine that blocks without an assigned headline are orphan blocks, and where an orphan block is identified, to determine whether there are any candidate blocks that may be linked to the orphan block; and
constructing, using the results of the classifier, an article that includes a headline block and a body-text block,
wherein a block is a candidate block if the bottom of the candidate block is located below the top margin of a section-starter orphan block.

16. The computer readable storage medium of claim 15, further comprising:
merging a first headline paragraph with a second headline paragraph, wherein the first and second headline paragraphs are not merged if text within the first and second headline paragraphs are not aligned; and
merging a first body-text paragraph with a second body-text paragraph, wherein the first and second body text paragraphs are vertical neighbors and are merged only if a margin of the first and a margin of the second body-text paragraphs are essentially aligned.

17. The computer readable storage medium of claim 15, further comprising:
associating a specific headline block to a body-text block where the midpoint of the specific headline block lies above the midpoint of the body-text block and the specific headline block horizontally overlaps the body-text block.

18. The computer readable storage medium of claim 15, further comprising:
computing a plurality of features associated with an identified comprising:
generating a block geometry based on an upper corner coordinate, a width, and a height, of a block bounding box;
identifying a closest headline above the identified block, if present, and determine if a line exists between the identified block and the identified closest headline; and
computing, for all neighboring blocks, whether there is a line separating the two blocks.

19. The computer readable storage medium of claim 15, further comprising:
identifying an orphan block,
wherein if the orphan block is a section-starter orphan block then it may be linked to another identified block when the section-starter orphan block is an orphan block immediately below a section-separator or at the top of a page, and
wherein an identified block is a candidate block only if there is no other block between a margin of the candidate block and a margin of the section-starter orphan block where the bottom of the candidate block is below the top margin of the section starter orphan block.

20. The computer readable storage medium of claim 15, further comprising:
determining if a plurality of text blocks belong to the same article based on an adjacency matrix comprising the candidate block; and constructing an article based on the adjacency matrix.

* * * * *